United States Patent Office 2,912,793
Patented Nov. 17, 1959

2,912,793

NEMATODE CONTROL BY SULFUR DIOXIDE AND AMMONIA

Bobbie D. Stone, Miamisburg, and Eli Seifter, Dayton, Ohio, and Philip H. Santmyer, St. Louis, Mo., assignors to Monsanto Chemical Company, St. Louis, Mo., a corporation of Delaware No Drawing. Application September 4, 1956
Serial No. 607,553

2 Claims. (Cl. 47—58)

This invention relates to a novel method for the control of nematode infestations, and more particularly provides a method of reducing nematode populations by injecting sulfur dioxide below the surface of soil infested therewith.

The importance of nematodes as agricultural pests is now generally recognized. Almost all cultivated ornamental and economic plants are subject to attack by one or another species of nematode. While the effects of nematode attack may extend to complete crop loss, the more usually observed result of such infestation is a diminishment in the vigor of infested plants, with consequent reductions in yield. Nematode attack may also weaken crops so as to produce accentuated susceptibility to other agricultural hazards such as fungal diseases.

In accordance with this invention, nematodes are controlled by introducing sulfur dioxide substantially below the surface of soil infested therewith.

It has been proposed hitherto to use sulfur dioxide as an insecticidal fumigant. That this compound should be effective as a nematocide is, however, surprising, since insecticides are not generally also effective as nematode toxicants.

The species of helminths, i.e., worms, which are designated nematodes are quite different from the other kinds of worms. They are not closely related to the earthworms, flatworms, wire worms, grubs, and cutworms, but are in a class apart, and, in fact, have no close relatives. Compounds, such as the new phosphorous-containing insecticides, the activity of which is dependent upon the inhibition of cholinesterase, are of doubtful value against nematodes, since this enzyme, characteristic of insect metabolism, does not appear to be universally present in the nematode organisms. The motility, respiration and feeding habits of insects likewise render them far more susceptible to a variety of toxicants than the unspecialized and less differentiated lower organisms such as the nematodes. Thus, for example, insect species breathe through tracheae, which are the sole avenue of access for many of the fumigant insecticides; nematodes, on the other hand, absorb their oxygen requirement through the cuticle. Insects have a surface network of sensory nerves, susceptible to ready access by toxicants; the rudimentary nerve system of a nematode is deeply imbedded in the organism, where it is protected by a relatively impermeable cuticle, and two muscle layers. Thus there is no necessary correlation between insecticidal and nematocidal activity; and, in fact, the existence of one does not imply the other.

It has now been found that sulfur dioxide, introduced as a liquid or gas into soil at a level substantially below the earth surface, is an effective nematode toxicant.

Advantages of sulfur dioxide over previously known nematocides are that it is a very cheap and readily available material, and that it decomposes in the soil to give a residue (sulfate ion) which is known to be free of objectionable effects on crops.

It is essential that nematocidal agents for agricultural use either be non-phytotoxic, or decompose relatively rapidly into non-phytotoxic residues. The majority of economically practicable nematocides in current use fall into the latter category; while initially herbicidal, they decompose within a few weeks in the soil, leaving degradation products which are apparently free of phytotoxic effects on seedlings. However, as experience with nematocides has accumulated, it has been found that although these degradation products are not immediately harmful to subsequently planted crops, they may subsequently exert unexpected disadvantageous effects thereon. Thus, e.g., halogenated lower hydrocarbons are commonly used to fumigate soils used for tobacco production. It has been found that tobacco grown in such fumigated fields has a halogen content greatly in excess of normal: the bromine content has been reported to have been increased on the average by a factor of about twenty, and extraordinarily high chlorine contents have also been reported. This high halogen content has a deleterious effect on the fire-holding properties of tobacco, a quality important, for example, in the manufacture of fine cigars.

The residue from application of sulfur dioxide to soil, however, is simply the sulfate ion. For the last half century, fields under agricultural cultivation have been fertilized by treatment with sulfate salts such as ammonium sulfate. Accordingly, the safety and unobjectionableness of sulfate residues in the soil is well established.

Sulfate residues derived from application of sulfur dioxide to soil may actually contribute desirable fertilizer values. It is known that the fields considered of sufficient value to warrant the cost of nematocidal treatment are those which are farmed intensively, without intervals in which a rotation crop is planted or the land is allowed to lie fallow. Fertilizer applications are required if continuous fertility is to be maintained. Particularly with the present tendency toward synthetic fertilizers consisting of high concentrate nitrogen-phosphorus-potassium mixes, deficiencies in trace elements may become increasingly important in fields subject to intensive farming practices. By application of sulfur dioxide in accordance with the present invention, there is supplied a valuable source of sulfur for the metabolism of plants and of soil-dwelling beneficial organisms, which would otherwise lack a reservoir of this important element.

Alkaline soils, furthermore, can benefit from nematocidal sulfur dioxide applications by reason of the acidulating effects thereof. On the other hand, when nematodes are to be eradicated from acid soils in accordance with the method of this invention, any undesirable consequent decrease in the soil pH may readily be neutralized by subsequent application of an alkaline fertilizer, e.g., lime or ammonia. If desired, the same apparatus used to inject the sulfur dioxide into the soil may subsequently be employed for adding fertilizer ammonia thereto.

In carrying out the present invention, sulfur dioxide is introduced into nematode-infested soil substantially below the earth surface. The preferred depth of application is about 6–8 inches. At much shallower depths, the sulfur dioxide may volatilize out of the soil and be lost too rapidly for effectiveness. Greater depths may be difficult to attain with conventional equipment, and the action of the sulfur dioxide may fail to extend to nematodes in the surface layers of soil when the nematocidal agent is buried too deeply.

Sulfur dioxide, while a gas at ordinary temperatures and pressure, may readily be liquefied. Most conveniently, it is handled and transported as an anhydrous liquid. At the point of introduction into the soil, the sulfur dioxide may be either in gaseous or in liquid form. The liquid will volatilize rapidly upon the release of pressure, and generally the state in which the sulfur dioxide contacts the soil and the nematodes therein will depend essentially upon the method of application.

Any of a wide variety of means may be employed to accomplish the introduction of sulfur dioxide substantially below the surface of nematode-infested soil in accordance with this invention. Thus, for example, there may be employed a hand injector, operated by forcing a plunger into the soil to the required depth, ejecting the sulfur dioxide from the nozzle of the plunger, and desirably, thereafter covering up the hole produced. A similar series of operations may be carried out with mechanized equipment. Alternatively, instead of injection at a series of discrete points, the nematocidal liquid or gaseous sulfur dioxide may be streamed into a furrow. An exemplary operation with equipment for this purpose employs a cultivator shovel cutting open a channel in the soil to the necessary depth. The shovel is followed by a pipe, which may be attached to the shovel; the nematocidal agent flows from this pipe. Finally, by means of a back-fill device, the channel is again covered over, so that the nematocidal agent remains enclosed in the soil. Equipment of this nature, employing lengthy booms for the simultaneous operation of multiple applicators as described above, is presently commercially available in a variety of forms designed, e.g., for the application of anhydrous ammonia as a fertilizer. Other modes of introducing sulfur dioxide into soil in accordance with this discovery will be readily apparent.

Sulfur dioxide is a corrosive material, and suitable precautions in handling should be observed. Thus, for example, most types of rubber are attacked by this compound, and appropriately resistant rubbers or plastics should be employed in equipment designed to store and apply this sulfur compound.

The amount of nematocidal agent to be applied to soil in accordance with this invention will vary, depending on the manner of application, the extent of infestation, the porosity and moisture content of the soil, etc. Preferably, the sulfur dioxide will at least be applied to each row wherein seeds are to be planted. Under circumstances such as severe infestation, the application may need to be made at closer intervals than the intended spaces between the crop rows. Exemplary rates of application may vary from 50 to 500 pounds per acre, and under average conditions, may be, for example, from 100 to 250 pounds per acre. Lightly-infested areas may be treated effectively with smaller concentrations.

After application of the present nematocidal agent to the soil, it is preferable to allow an interval of a few weeks to elapse before a crop is planted. The waiting period allows time for the sulfur dioxide to rid the soil of its nematode population and then to decompose into sulfate ions. Generally, this decomposition may be assumed to be complete within two to four weeks. As pointed out above, if the soil is then too acid for the crop which is to be planted, an alkaline fertilizer may be applied to the soil just prior to or simultaneously with the introduction of seed.

The following examples illustrate modes of operation of the present invention.

Example 1

Earthenware 2-gallon crocks were prepared containing 1 cu. ft. of soil infested with root knot (*Meloidogyne incognita* var. *acrita*). Three crocks were left untreated, and three received 1 gm. of liquid $SO_2$ applied through a glass tube reaching to the bottom of the crock. After addition of the fumigant, the tube was withdrawn and the soil lightly packed. In the crocks treated with $SO_2$, the pH dropped from 6.8 to 4.2 in the first week. Since this pH is too low for tomatoes, sufficient calcium oxide was added to these crocks to bring the pH back to approximately 6.5. This procedure was followed until all evidence of phytotoxicity due to a low soil pH had disappeared.

Three 1" tomato plants were planted in each crock, and at the end of about 2 months growth, the experiment was harvested and the roots of each plant were washed, stained, and examined microscopically for evidence of root knot infestation.

The plants harvested from the untreated crocks were stunted and appeared to be dying as a result of a very heavy nematode infestation. In the crocks treated with the nematocidal agent, the plants were healthy and substantially free of nematodes, as shown by the following data, wherein the infestation index of 1 indicates absence of nematode infestation, 2, barely recognizable infestation, and 5, heavy infestation leading to severe plant damage and death.

| | Plant | Index of Infestation |
| --- | --- | --- |
| Crock Number check: No treatment— | | |
| 1 | A | 5 |
| | B | 5 |
| | C | 5 |
| 2 | A | 5 |
| | B | 5 |
| | C | 5 |
| 3 | A | 5 |
| | B | 5 |
| | C | 5 |
| Avg | | 5.0 |
| $SO_2$ treatment— | | |
| 1 | A | 1 |
| | B | 1 |
| | C | 2 |
| 2 | A | 2 |
| | B | 2 |
| | C | 2 |
| 3 | A | 1 |
| | B | 5 |
| | C | 1 |
| Avg | | 1.9 |

Example 2

To introduce sulfur dioxide into soil in experimental plots infested with nematodes such as the sting nematode, root knot nematodes, etc., 50 foot lengths of plastic tubing perforated by a small hole every 12 inches are buried in trenches 6 inches deep. Sulfur dioxide is pressed into the tubing and allowed to escape therefrom into the soil. Subsequently, the tubing is removed and soybeans, peanuts and cotton are planted along the 50 foot rows. At rates of 150 lbs./acre, phytotoxic effects are absent, and the effectiveness of the nematocidal treatment can be gauged by increased vigor, size, and yield of the treated crop row as compared to a control, untreated seedbed, and by inspection of the roots of plants from the treated row to establish absence of evidence of nematode attack.

In addition to use in farm lands, the present nematocidal agent may also be employed in other nematode environments, such as greenhouse potting mixtures and other soil substitutes. Sulfur dioxide may also be employed in accordance with this invention for the sterilization of barnyard and other soils harboring phases of animal parasitic helminths.

While the invention has been described herein with reference to particular preferred embodiments thereof, other methods of carrying out the invention will be evident to those skilled in the art, and it is intended that the invention is to be limited only as defined in the appended claims.

What is claimed is:

1. The method controlling nematodes comprising introducing sulfur dioxide susbtantially below the surface of nematode infested soil, and after allowing sufficient time for the sulfur dioxide to kill the nematodes raising the pH of the soil to substantial neutrality by the addition of ammonia thereto thereby making the soil ready for planting a crop.

2. The method of claim 1 wherein the amount of suldur dioxide added to the soil is in the range of from 50 to 500 pounds per acre.

References Cited in the file of this patent

UNITED STATES PATENTS

| | | |
|---|---|---|
| 380,189 | Clemm | Mar. 27, 1888 |
| 1,222,677 | Sargent | Apr. 17, 1917 |
| 2,598,121 | Hannibal | May 27, 1952 |
| 2,781,612 | Dugan | Feb. 19, 1957 |

OTHER REFERENCES

Publication: Biological Abstracts, vol. 2, published 1928, page 1161, Entry, 12,376 "L'Emploi de L'Anhydride Sulfureux Liquifie en Agriculture."